R. B. LIEDLOFF.
AUXILIARY BRAKE MECHANISM.
APPLICATION FILED MAR. 27, 1917.
1,254,246. Patented Jan. 22, 1918.
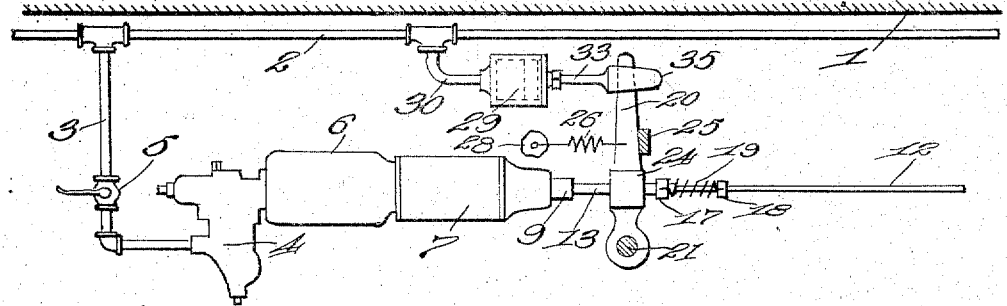
Fig. 1.
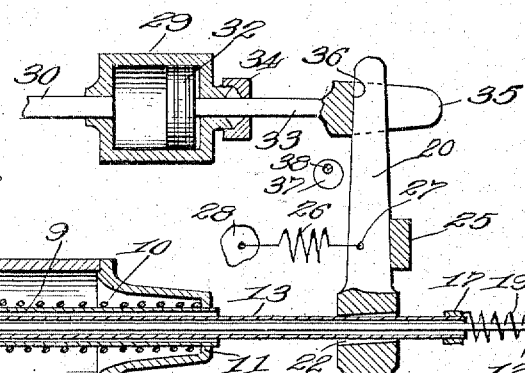
Fig. 2.
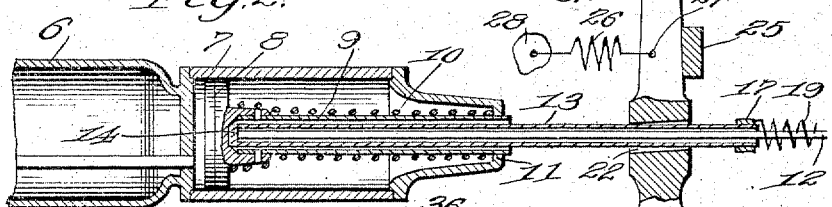
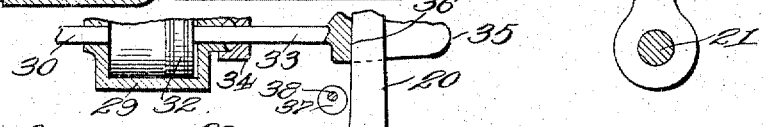
Fig. 3.
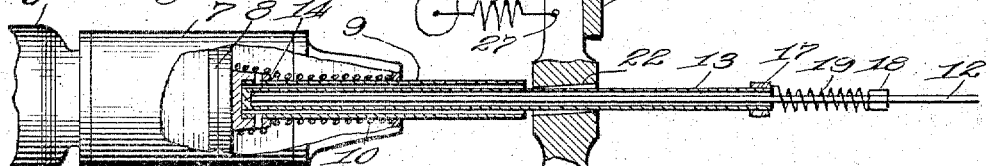
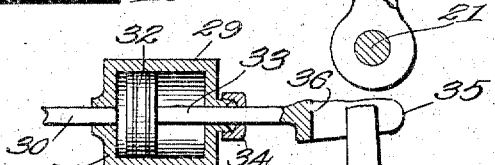
Fig. 4.
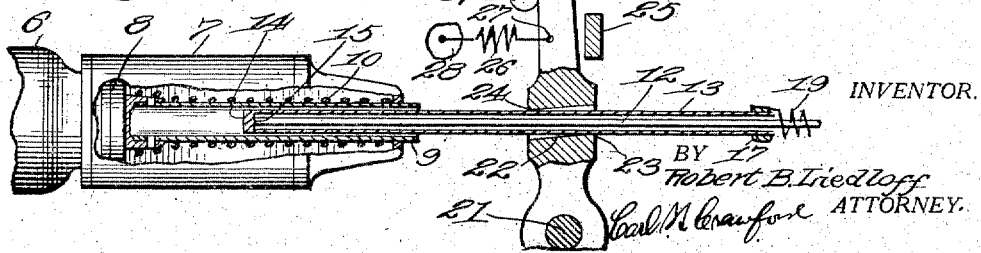
INVENTOR.
BY Robert B. Liedloff
ATTORNEY.

UNITED STATES PATENT OFFICE.

ROBERT B. LIEDLOFF, OF SPOKANE, WASHINGTON.

AUXILIARY BRAKE MECHANISM.

1,254,246.  Specification of Letters Patent.  Patented Jan. 22, 1918.

Application filed March 27, 1917. Serial No. 157,842.

*To all whom it may concern:*

Be it known that I, ROBERT B. LIEDLOFF, a citizen of the United States, residing at Spokane, in the county of Spokane and State of Washington, have invented new and useful Improvements in Auxiliary Brake Mechanism, of which the following is a specification.

This invention relates to improvements in auxiliary brake mechanism for an air brake system.

One of the objects of this invention is to provide an auxiliary mechanism which will function to hold the brakes of a car in an air-set position after air leakage has occurred or if for any other reason the air fails to hold the brakes. My invention includes, in this structure, an automatic feature whereby the auxiliary brake-holding mechanism will act automatically in the performance of its function.

It is not a feature of my invention to supplant, modify or in any way substitute mechanism of my invention for the air brake systems now in use, it being a cardinal feature of my invention that means is provided for rendering the auxiliary device inoperative as long as the brake system is operative and the device of my invention only becomes operative when the air brake system itself fails to perform its function. Thus when a car is detached from a train or switched onto a siding, if the siding is on an incline, it is customary to set the brakes by air to hold the car against movement down the siding. However, after the car has stood on the siding for a period of time varying in accordance with the condition of the air brakes on the car, it has been found that leakage occurs and the brakes are gradually released because of the fact that the brake system is not tight enough to hold the air. In order to prevent a car from getting started and running wild, it is customary, after the brakes have been set by air, to also set the brakes by hand so that after the air leaks out, the brakes will hold the car against movement. However, this setting and releasing of the hand brakes require a great deal of time which it is one of the objects of my invention to avoid.

When a car is equipped with the device of my invention, it can be switched onto a siding and after the air has set the brakes, then leakage from the system will release the device of my invention for operation, automatically, to hold the brakes in the air-set position. When the car is again coupled up to the train line, the re-establishment of pressure in the brake system of the car will automatically render the device of my invention inoperative thereby permitting the car to assume an operative relation with the rest of the cars of the train to which it is attached or coupled.

Thus it will be seen that the device of my invention only operates when the air brake system fails to operate, and when the system is in operation, the device of my invention is always in an inoperative position.

My invention will be more fully described in connection with the accompanying drawing and will be more particularly pointed out in and by the appended claims.

In the drawing:—

Figure 1 is a view in elevation of a portion of an air brake system as applied to a car and showing the manner in which my invention is applied thereto.

Fig. 2 is a sectional view of parts shown in Fig. 1, on a large scale, with the device of my invention in an inoperative position and showing the brake system retracted.

Fig. 3 is a view similar to Fig. 2 showing the device of my invention inoperative and illustrating the brake piston advanced to apply the brakes.

Fig. 4 shows the brake cylinder retracted and the device of my invention in an operative position.

Like characters of reference designate similar parts throughout the different figures of the drawing.

As illustrated, 1 designates the bottom of a car from which is suspended the usual train line pipe 2. The train line 2 is connected by a pipe 3 with a triple valve 4, the usual hand cock being shown at 5. The auxiliary reservoir is designated at 6 and the brake cylinder at 7. The brake cylinder 7 is provided with a piston 8 having a hollow piston rod 9, the latter projecting slightly from one end of the cylinder when the piston 8 is fully retracted, as shown in Fig. 2. A retracting spring 10 is interposed between the piston 8 and a shoulder 11, formed on the cylinder. A push rod, which I will hereinafter term the brake rod, is designated at 12, and the same projects into the hollow piston rod 9 for actuation by the piston 8 when the latter is energized by pressure for a brake-setting stroke. All of the foregoing is common to the general type of air-brake system now in use.

I will next describe the attachment which comprises the device of my invention.

A brake rod holding member is provided which, in the present construction, is in the form of a clutch or holding sleeve 13. This sleeve 13 telescopes over the piston end of rod 12 and is provided with a closed actuating end 14 against which the end 15, of the brake rod, is adapted to engage. Broadly speaking, the brake rod 12 is held by the sleeve against retraction independently thereof. The blind or holding end 14 of the sleeve is interposed between the end 15 of the brake rod and the piston 8 so that when the latter is actuated on its pressure stroke, it will first engage the end 14 of the sleeve 13, and acting thereto, will engage the end 15 of the rod 12 to advance the same to a brake setting position. When the piston 8 is released, then the brake rod 12, on its retractive movement from a brake setting position will also retract sleeve 13. Thus the sleeve 13 and the rod 12 will always be in relatively close predetermined relation. I prefer to yieldingly connect the sleeve 13 with the rod 12 so as to reduce lost motion as much as possible and always hold the blind or actuating end 14 in close relation to the end 15 of the rod 12. As illustrated, I provide a collar 17, on sleeve 13, and a collar 18 on rod 12. A contractile spring 19 has its ends connected with said collars so that the rod and sleeve will at all times occupy the relation shown in Fig. 4.

I will next describe the manner in which the sleeve 13 is clutched in order to prevent retractive movement of the rod 12 from the brake setting position, this function being performed when the device of my invention is operative.

A clutch lever is designated at 20 and the lower end thereof is mounted upon a fixed pivot 21 which is very firmly anchored in any suitable manner, not shown. Above the pivot 21, the lever is provided with a clutch bore 22 through which the sleeve 13 is normally slidable. It will be noted that the axis of the clutch bore is not at right angles to the longitudinal axis of the lever but is slightly oblique thereto. Thus it will be seen that when the lever is in an inoperative position, as shown in Figs. 2 and 3, the sleeve 13 can readily pass to and fro through the lever without restriction. However, when the lever 20 is in the clutch position shown in Fig. 4, then portions 23 and 24 will clutch or bite into the sleeve 13 to hold the latter and the rod 12 against retraction. A fixed stop 25 limits movement of the lever 20 toward an inoperative position. A contractile spring 26 having one end fixed to lever 20, as indicated at 27, and the other end fixed to a suitable stationary part as indicated at 28, normally acts to retract lever 20 from the inactive position shown in Fig. 3 to the active position shown in Fig. 4. By reason of the construction of the clutch bore, it will be seen that only a slight movement of the lever is necessary in order to cause the lever to clutch and hold the sleeve 13.

I will next describe the manner in which the lever 20 is controlled by air pressure in the system so that it will normally be held inoperative when the air system is operative under air pressure, and will be released for operation when leakage occurs which would otherwise release the air from holding the parts to a brake-set position.

A cylinder 29 is connected by a pipe 30 with pipe-line 2 so that the cylinder 29 will always be filled with straight air when the car is connected up with the train line. It will also be noted that the pressure end 31, of cylinder 29, is a blind end. A piston 32 is disposed in said cylinder and is provided with a piston rod 33 which projects through a suitable packing gland 34. The piston rod 33 terminates in a jaw or bifurcated end having arms 35 which are of sufficient length to extend in guiding relation on opposite sides of the upper end of lever 20, irrespective of the position of the parts. The bight or crotch of the fork or bifurcation is indicated at 36 and the same is adapted for engagement against the edge of lever 20, as shown in Figs. 2 and 3.

A hand or manual release device is provided for the purpose of releasing clutch action of the device of my invention just before the car is hooked up or coupled up with a train.

As shown, a cam 37 is mounted upon a cam spindle 38 and the cam spindle 38 will be mounted in suitable bearings, not shown, to hold the spindle 38 to a fixed axis of rotation. The spindle 38 will extend laterally to the side of the car and may be provided with any suitable form of crank whereby the cam 37 may be turned in a contra-clockwise direction, looking at Fig. 4, to restore the lever 20 to the position shown in Fig. 3, thereby releasing clutch action on the sleeve 13.

I will now describe the operation of my invention under various conditions.

In the drawing, there is shown enough of a single unit of the air system to make the application clear, and therefore in the following description, reference to the complete air system may be made intelligently without a full showing.

Assuming that the car was coupled up with a train, it will now be clear that the direct connection of the what I may call the cut-off or throw-out cylinder, with the train line 2, will insure the position of the throw-out piston 32 in a throw-out or cut-out position as shown in Fig. 2. Thus throughout the normal operation of the brake system, and while the car is coupled up with the train, the lever 20 will always be forced against the stop 25 by the piston 32 so that the sleeve 13 will be free to reciprocate through the bore 22. Therefore, assuming that the car was coupled up with a train, the piston 8 could be advanced under pressure to the brake-applying position shown in Fig. 3, and the sleeve 13 together with the brake rod 12 would be advanced accordingly. In other words, because of the blind end 14, the brake rod would be advanced with the sleeve. By reason of the spring 19, it will be seen that after the piston 8 was released from pressure, then the spring 10 would retract the piston 8, as shown in Fig. 4, and the action of the brakes, tending to release themselves from the wheels, would retract the rod 12 and the rod 12, engaging the blind end 14, would correspondingly retract the sleeve, the spring 19 functioning to prevent the blind end 14 from being retracted farther than the rod 12. The foregoing clearly illustrates the operation while the car is coupled up with the train.

Now assuming that a car was uncoupled from a train with the idea of switching the car onto a siding, it will be apparent that if the siding was on an incline or was down hill, then the switchman would turn the angle cock when he uncoupled the car and after the car got to the desired position on the siding, the air brakes would be applied from a source of pressure in the auxiliary reservoir. The train line 2 would still contain air pressure which would maintain the piston 32 in a throw-out position, as shown in Fig. 2. Ordinarily, it is the rule to apply the hand brake to a car on a siding, if it is a down hill siding, but sometimes this rule is not complied with. After a car has been uncoupled from a train and has stood for a period of time on a siding, dependent upon the condition of the car's unit of air brake system, leakage of air will occur and the piston 8 will be released. Just as soon as this leakage occurs, then the pressure on piston 32 will be released and the jaw will therefore release lever 20 for action by spring 26. Spring 26 will retract lever 20 into a clutch position, as shown in Fig. 4, and therefore the device of my invention will automatically and mechanically hold the brakes in the air-set position without necessitating manipulation of the hand brake. This condition of the mechanism will be maintained, as long as the car is on the siding and its maintenance will not depend upon air pressure, but will be absolutely positively maintained by a mechanical clutch which could in no way become released.

Before coupling up the car to a train, the switchman would manually operate the cam device 37 so as to throw the lever 20 sufficiently out of an active position such as would release the sleeve 13. Then the brakes would instantly be released and as soon as the air pressure entered the train line of the car, then the piston 32 would instantly be returned from the position shown in Fig. 4 to the position shown in Fig. 2, thereby holding the lever 20 firmly against the stop 25 and in an inoperative position.

It will now be clear that it is a cardinal feature of my invention to rely upon a positively acting mechanical mechanism for holding the brake in an air-set position, such mechanical mechanism not being in any way energized or dependent upon the air in the system for its active operation. The only dependence placed upon the air of the system for operation of the device of my invention is in maintaining the device inoperative. This can be relied upon absolutely because irrespective of leakage in the system, it will be understood that when a car is coupled up to the train there is always a source of air supply from the engine which will overcome any defects in the system, within practical limit.

Another feature of my invention which enhances security is the fact that the throw-out cylinder 29 is directly connected with a source of supply of straight air thereby not only providing positive but quickly responsive action.

A great source of danger in hilly countries results from cars on a siding, starting down-hill and running wild on the main tracks, and the great losses and heavy damages to which railroads have been subjected on account of these accidents could be wholly avoided by maintaining the brakes of a detached car in an air-set position so that the car or cars could never get started.

It will also be noted that with the device of my invention, railroads will not be compelled to maintain their air equipment even up to the standard at which they now maintain it because of the absolute brake control which is afforded on detached cars.

It is believed that the novelty and utility of my invention will be fully understood from the foregoing description, and while I have herein shown and described one specific form of my invention, I do not wish to be limited thereto except for such limitations as the claims may import.

I claim:—

1. In combination, an air brake system, automatically acting mechanism for maintaining the brake in an air-set position upon air leakage from the system and freeing the actuating portion of said system for recoil to a normal position, and means controlled by the air of said system for normally maintaining said mechanism inoperative prior to air leakage and releasing said mechanism for automatic operation upon leakage from said system, substantially as described.

2. In combination, an air brake system, auxiliary mechanism adapted to maintain the brake in an air-set position and being free from positive connection with the brake actuating portion of said system, and means controlled by the air of said system for normally maintaining said auxiliary mechanism inoperative prior to air leakage and releasing said mechanism for operation upon air leakage from the system, substantially as described.

3. In combination, an air brake system, auxiliary mechanism for holding the brakes in an air-set position and being free from positive connection with the brake actuating portion of said system, and means energized by the air of said system under an operative pressure for maintaining said mechanism inoperative and releasing said means upon decrease of pressure in said system to permit said mechanism to operate, substantially as described.

4. In combination, an air brake system, auxiliary clutch mechanism for holding the brakes in an air-set position and being free from positive connection with the brake actuating portion of said system, and means energized by the air of said system under an operative pressure for maintaining said mechanism inoperative and releasing said means upon decrease of pressure in said system to permit said mechanism to operate, substantially as described.

5. In an air brake system, a brake rod connected for actuation by said system to set the brakes, and automatically acting mechanism independent from that portion of the system actuating said rod for holding said rod to an air brake set position upon release of stress on said rod by said system, substantially as described.

6. In an air brake system, a unit of the air brake for each car for setting the brakes of such car, and automatically acting mechanism independent of that portion of the air brakes unit actuating the brakes for each car for holding the brakes in an air set position upon release of the brakes by such car unit system after the car has been disconnected from the train, substantially as described.

7. In an air brake system, a unit of an air brake system for each car for setting the brakes of such car, and mechanically acting automatic mechanism for each car independent of that portion of the air brakes unit actuating the brakes for holding the brakes of such car in an air-set position after the car has been disconnected from the train and upon release of the brakes by such unit of the system, substantially as described.

8. In combination, an air brake system including a brake piston, a push rod adapted to be advanced by pressure movement of said piston and independently retractable with respect thereto, a clutch sleeve coupled to said rod against retraction of said rod independently of said sleeve and adapted to be advanced with said rod by said piston on pressure movement of the latter, automatically acting mechanism for gripping said sleeve to hold said rod in an air-set position upon leakage from said system, and means actuated by normal pressure in said system for normally rendering said mechanism inoperative, substantially as described.

9. In combination, an air brake system, and automatically acting mechanical mechanism for maintaining the brakes in an air-set position upon air leakage from said system irrespective of the position assumed by the brake piston resulting from air leakage, substantially as described.

10. In combination, an air brake system, and automatically acting mechanism for maintaining the brakes in an air set position prior to release of the brakes by air leakage from said system irrespective of the position assumed by the brake piston resulting from air leakage, substantially as described.

11. In combination, an air brake system including a brake piston, a brake rod and a clutch member adapted to be actuated by said piston and said rod and clutch member being operatively connected with each other against independent movement of the rod with respect to said member in one direction, and means for clutching and holding said member to maintain said rod in the position into which the piston actuated it irrespective of the position assumed by said piston, substantially as described.

12. In combination, an air brake system, automatically acting mechanism independent of the brake actuating portion of said system for maintaining the brakes in an air-set position prior to release of the brakes by air leakage from said system, and means actuated by the air of said system for maintaining said mechanism operative, substantially as described.

13. In combination, an air brake system including a train pipe, automatically acting mechanism independent of the brake actuating portion of said system for each car for holding the brakes in an air-set position after the car has been detached from the train and air leakage or bleeding has occurred in the car's system, and means energized by direct air from the train pipe for rendering said mechanism inoperative after the car has been air-coupled to the train, substantially as described.

14. In combination, an air-brake system, automatically acting mechanism independent of the brake actuating portion of said system for each car for holding the brakes in an air-set position after the car has been detached from the train and air leakage by bleeding has occurred in the air brake system, and a device for each car for rendering said mechanism inoperative, substantially as described.

15. In combination, an air brake system including a brake rod and a rod holding sleeve therefor, and means for clutching said sleeve to hold said rod in an air-set position said means including a lever pivoted laterally of said sleeve and having a clutch bore through which the sleeve projects and said bore having its axis obliquely disposed with respect to the longitudinal axis of the lever, and normally acting to move said lever into a sleeve clutching position, substantially as described.

16. In combination, an air brake system including a brake rod and a rod holding sleeve therefor, means for clutching said sleeve to hold said rod in an air set position, said means including a lever pivoted laterally of said sleeve and having a clutch bore through which the sleeve projects, means normally acting to move said lever into a sleeve clutching position, and means controlled by the air of said system for moving said lever into an unclutching position, substantially as described.

In testimony that I claim the foregoing as my own, I hereby affix my signature.

ROBERT B. LIEDLOFF.